United States Patent [19]

DeLuca et al.

[11] Patent Number: 4,788,085

[45] Date of Patent: Nov. 29, 1988

[54] COMPOSITION AND METHOD FOR THE PRESERVATION OF PLANTS

[75] Inventors: John E. DeLuca; Sharon K. DeLuca, both of Aurora, Colo.

[73] Assignee: Foliage Plus, Inc., Shakopee, Minn.

[21] Appl. No.: 927,317

[22] Filed: Nov. 4, 1986

[51] Int. Cl.$^4$ .................. A01G 5/06; A01N 3/00; A41G 1/00

[52] U.S. Cl. .................. 428/18; 252/384; 427/4

[58] Field of Search .................. 427/4; 428/22, 18; 252/384

[56] References Cited

U.S. PATENT DOCUMENTS

| | | |
|---|---|---|
| 547,227 | 10/1895 | Pfitzer . |
| 952,245 | 3/1910 | Gardner . |
| 1,489,130 | 4/1924 | Koropp et al. . |
| 2,581,299 | 1/1952 | Rogers .................. 47/58 |
| 2,805,137 | 9/1957 | Clopton .................. 71/2.4 |
| 3,976,495 | 8/1976 | Buckman et al. .................. 106/15 R |
| 4,117,150 | 9/1978 | Pommer et al. .................. 424/285 |
| 4,243,693 | 1/1981 | Nordh .................. 427/4 |
| 4,248,734 | 2/1981 | Romero-Sierra et al. .................. 252/400 R |
| 4,272,571 | 6/1981 | Romero-Sierra et al. .................. 428/24 |
| 4,287,222 | 9/1981 | Robinson .................. 427/4 |
| 4,349,459 | 9/1982 | Romero-Sierra et al. .................. 252/400 R |
| 4,349,580 | 9/1982 | Romero-Sierra et al. .................. 427/4 |

*Primary Examiner*—Michael Lusignan
*Attorney, Agent, or Firm*—Willian Brinks Olds Hofer Gilson & Lione Ltd.

[57] ABSTRACT

A method and composition for the preservation of plants. The composition comprises a preservative and a facilitator to increase the rate of aspiration of the preservative by the plant. The preferred preservative is glycerine and the preferred facilitator is dimethyl sulfoxide. Two processes for systemic application of the preservative composition are disclosed.

37 Claims, No Drawings

COMPOSITION AND METHOD FOR THE PRESERVATION OF PLANTS

FIELD OF THE INVENTION

This invention relates to a preservative composition capable of preserving plants by systemic application. This invention also relates to a method of preserving various plants and to products produced thereby.

BRIEF DESCRIPTION OF THE PRIOR ART

The indoor use of natural plants and small trees as decorative items creates a pleasing ad aesthetic appearance. However, live plants and trees are often difficult to care for and frequently die if environmental conditions indoors are not properly controlled. Therefore, artificial preservation of natural plants has been pursued as a balance between the desirability of appearance and the problems associated with tending for living plants.

Various compositions and methods for the preservation of trees and other plants for decorative and ornamental purposes are known in the art. A number of compounds have been suggested as preservatives, including glycerine, formalin, ethylene glycol and lower carboxylic acids. Glycerine is probably the most prevalent, being used in a preservative solution as early as 1919 in Koropp et al., U.S. Pat. No. 1,484,656. Other references to the use of these chemicals as preservatives include: Nordh, U.S. Pat. No. 4,243,693; Romero-Sierra et al., U.S. Pat. Nos. 4,278,715 and 4,328,256; and Sheldon et al., U.S. Pat. No. 3,895,140.

It is believed that glycerine acts as a preservative by entering the cellular structure of a plant thereby replacing a portion of the naturally occuring water. The remaining water dehydrates from the cell leaving substantially only the glycerine. Because glycerine is a stable compound it will remain in the cellular structure of a plant indefinitey thereby maintaining the cells in a turgid state and preventing collapse of the cell walls.

Various methods of application of a preservative to a plant have been developed. Some processes require drying of the plant before application of the preservative. Examples of this method can be found in U.S. Pat. Nos. 1,962,667 by Moore, and 1,484,656 by Koropp. This method is more suitable for smaller plants such as leaves, grasses, and flowers than for larger woody plants such as trees. Furthermore, drying of plants has the limitation that subsequent application of preservative must be done non-systemically because the drying destroys the plant's ability to aspirate liquids.

Methods of applying a preservative by immersion of the plant in a preservative solution are known in the art. For example, in Romero-Sierra, et al., U.S. Pat. Nos. 4,278,715 and 4,328,256 a method of preserving foliage is disclosed in which the entire tissue to be preserved is immersed in the preservative solution. This technique is suitable for flowers, foliage and small plants, however, when preserving trees, immersion becomes cumbersome. Very large quantities of preservative solution are required to completely immerse large items, and further, physically handling such items in the process is difficult.

To overcome these problems, systemic application of preservative compositions has been used. By introducing the desired solution into the nutrient transport system of a plant, the preservative can be carried throughout the plant by natural aspiration, thereby effectively preserving the plant. This method of preservation is illustrated in U.S. Pat. No. 4,243,693 by Nordh for application of a preservative comprising glycerine. In the process disclosed by Nordh, uptake of the preservative solution requires at least about five days. Although systemic application of preservatives, including glycerine, to plants is known in the art, one major obstacle has prevented successful commercial exploitation of the technology: slow uptake of preservative.

Slow uptake of preservative solutions extends the time during which successful uptake of solution is subject to interruption by a change in environmental conditions. If the preservative is being applied in the field, a change in weather can detrimentally affect the uptake of preservative. If application of a preservative is under artificial conditions, environmental factors conducive to uptake must be maintained for longer periods of time. Successful preservation of plants by systemic application, therefore, is dependent on the transport properties of the preservative composition.

A preservative solution comprising substantially only glycerine is too viscous to be systemically transported by plants. Preservative compositions therefore also comprise various solvents. Nordh disclosed water as a solvent in a glycerine preservative composition. Compositions and techniques for non-systemic application of preservatives and other chemicals have been disclosed. Sheldon describes a preservative solution for application by immersion comprising water and glycerine or mixtures of glycerine and polyglycerines wherein the solution is heated to 140° F. to reduce its viscosity. Manankov, U.S. Pat. No. 4,291,497, descibes a method of external application of chemical agents, such as pesticides, growth inhibitors, and antidisease agents; in which the chemical is mixed with a penetrating enhancing agent such as one of the polyhydric alcohols: dulicitol, arabitol, mannitol or sorbitol. The known prior art, however, fails to disclose an effective solvent for systemic application of a preservative.

Accordingly, there is a need for a preservative composition for which the uptake by a plant is rapid, for which the success rate approaches one hundred percent, and which is essentially independent of weather conditions.

It has now been found that dimethyl sulfoxide (DMSO) in certain active amounts is an effective solvent for a preservative composition which can preserve even large plants, such as trees twenty-five feet or taller. This capability is due primarily to the improved transport properties of the composition.

DMSO is a well known solvent and has been used in conjunction with such materials as insecticides, fungicides, and plant metabolism regulators. In Tsuruta et al., U.S. Pat. No. 4,217,130 and Shudo et al., U.S. Pat. No. 4,183,788, DMSO is listed as a solvent for compounds capable of regulating plant metabolism. Barlocher et al. U.S. Pat. 3,937,626 discloses a novel compound for promoting fruit abscission which was also tested as a preservative for cut flowers. The Barlocher et al. reference includes DMSO in a list as an optional solvent for concentrates of the compound.

There is no suggestion, however, in the known art of using DMSO with a preservative. The Barlocher et al. patent is directed towards a compound which is primarily a plant metabolism regulator which while tested as a preservative, was not particularly effective in that capacity. Further, in Barlocher et al., DMSO was not specifically discussed as a solvent for the compound when used as a preservative. There has been no suggestion in the known prior art, therefore, to use DMSO in conjunction with a preservative.

The present invention provides a composition for and method of systemically preserving plants in which uptake of the composition is rapid and the rate of success is high. This process is applicable to plants of varying types and sizes, and produces preserved trees and other plants with very lifelike appearances.

SUMMARY OF THE INVENTION

One embodiment of the present invention comprises a composition for preserving a plant. The composition comprises a preservative in an amount effective to preserve a plant and a facilitator. The facilitator is a material which, when systemically applied to the plant, in effective amounts, in admixture with said preservative, increases the rate at which the preservative is aspirated to effect transport of said preservative. In a specific embodiment of this invention, the preservative comprises glycerine and the facilitator is dimethyl sulfoxide. In another embodiment of the invention, the composition further comprises a dye capable of systemic transport within the plant.

A further embodiment of the invention comprises a process for preserving a plant. The process comprises introducing to the nutrient transport system of the plant a composition with a pH compatible with the plant comprising a facilitator in effective amounts and a preservative in effective amounts. A specific embodiment of this process comprises cutting the plant near its base after completion of the systemic transport of said composition and inverting the plant during dehydration whereby the limbs of the plant take on a natural position.

In another embodiment, the present invention involves a plant preserved with the instant composition.

DETAILED DESCRIPTION OF THE INVENTION

As used herein, the term "preservative" is defined as a composition comprising an active chemical or mixture of chemicals which is aspirated by a plant when systemically applied thereto and, once aspirated, which maintains a natural texture and shape in the plant.

As used herein, the term "facilitator" is defined as a chemical or mixture of chemicals which, when systemically applied to a plant in admixture with a preservative in effective amounts, increases the rate at which the preservative is aspirated and which effects transport of the preservative.

As used herein, the term "transport of the preservative" is defined as aspiration of the preservative to a sufficient portion of the plant to achieve a healthy lifelike appearance once preservation of that portion is effected.

As used herein, the term "aspirate" is defined as the action of a plant by which fluids are drawn into and throughout the plant.

As used herein, the term "systemic transport" means the transport of fluids within a plant by aspiration.

As used herein, the term "plant" is defined to include trees, woody plants, tropical plants, flowers, and grasses.

As used herein, the term "dye" is defined as a material or mixture of materials capable of producing a color change in a plant.

It has been found that systemic application of a composition comprising a preservative and a facilitator is surprisingly effective in preserving plants because it produces a rapid uptake of the composition and success rates approaching one hundred percent. In a preferred embodiment of the composition, the preservative comprises glycerine and the facilitator comprises dimethyl sulfoxide (DMSO). The process of the present invention comprises introducing a composition comprising a facilitator and a preservative with a pH compatible with the plant to the nutrient transport system of the plant and allowing systemic transport of said composition.

The facilitator in the composition of the present invention is a compound which, in effective amounts, increases the rate at which the preservative is aspirated and which effects transport of the preservative. It has been found that unexpectedly the facilitator can only be present in certain active amounts to be effective. If the facilitator is present in amounts outside this active range little or no improvement in aspiration of the composition over known processes is observed. However, dramatic increases in solution uptake are produced by introducing the composition to plants with the facilitator in effective amounts. Consequently, greatly enhanced rates of successful preservation due to a surprisingly greater incidence of transport of the preservative are also obtained.

Dimethyl sulfoxide (DMSO) has been found to be a highly efficient facilitator in the present invention. With DMSO used in effective amounts in accordance with this invention, complete transport of preservative in a thirty foot aspen and a twenty foot oak tree has been achieved in as little as eight hours. Rates of successful preservation of plants as high as ninety-nine percent can be obtained. These results have been found to be highly reproducible.

It has been determined that the effective amounts of DMSO when glycerine is the preservative are below about five percent by volume of the composition. Preferably, effective amounts of DMSO are between about one-half percent to about three percent by volume, and most preferably are between about one-half percent and one and one-half percent by volume of the composition. Ninety-nine percent successful preservation is achieved when DMSO is used in effective amounts when other factors are favorable.

The following compounds are also useful as facilitators: propylene glycol, ethylene glycol, diethylene glycol, triethylene glycol, glyme, dioxane, pyridine, dimethylformamide, diglyme, acetone, tetrahydrofurane, acetonitrile, triglyme, and 1-methyl-2-pyrrolidone. The glycol compounds are active in effective amounts when glycerine is the preservative from about five percent to about fifteen percent of the composition, and more preferably from about seven percent to about twelve percent. The remaining facilitators suggested above are active in effective amounts similar to those of DMSO when glycerine is the preservative, namely below about five percent by volume of the composition and more preferably between about one-half to about three percent by volume of the composition, and most preferably between about one-half percent and one and one-half percent by volume of the composition.

The preservative in the present composition comprises an effective chemical or chemicals which maintains a plant in a turgid state and prevents collapse of the cell walls. While not intending to be limited hereby, it is believed that the preservative functions by not volatizing or evaporating from inside a plant's cellular structure. The composition of the present invention is systemically applied to and aspirated by a plant. After this process is complete, it is thought that the water in the composition and water naturally occuring in the plant dehydrates, leaving behind in the plant cells substantially only the effective chemical or chemicals in the preservative. These chemicals in the preservative are believed to be sufficiently stable to remain in the plant and thereby prevent wilting and collapse of the cellular structure of the plant The preferred preservative in this invention comprises glycerine as the effective chemical compound. It has been found that best results are achieved when glycerine comprises about twenty to fifty percent by volume of the composition and preferably about twenty-five to forty percent by volume, and most preferably about thirty to thirty-five percent by volume.

The present composition and method are widely applicable to preserving many types of plants and are not to be considered limited to preservation of any particular species. Utility of the present invention in a particular instance can be readily determined experimentally by one skilled in the art by use of the composition and method disclosed herein. It is recognized that certain species of plants are not capable of aspiration of preservative compositions. The present invention, therefore, is directed toward preservation of plants capable of aspirating a preservative composition.

Two species of trees have been found to be particularly suitable for preservation by the instant composition: Populus tremuloides Michx or Quaking Aspen and the Quercus Utahensis Rydb or Scrub Oak. It has been found that species of trees within the same family have similar capacities to be preserved. For example, the Aspen belongs to the family Salicaceae which also includes Poplars, Cottonwoods and Willows. Results similar to those of preserving Aspens are also achieved with these trees.

Without intending to be limited hereby, the instant composition has been found to be effective for the following species of trees and other plants: bamboo, manzanita, magnolia, cedar, creosote bush, juniper, pepper, santa yerba, gypsophilia, fan palm, oak, Utah juniper, rice, chestnut, apple, service berry, mountain mahogany, and sage brush.

For the composition of the present invention to be effectively aspirated, it must have a pH compatible with the natural pH of the plant being preserved. The pH can be controlled in any conventional manner recognized in the art. Although the pH necessary for compatibility with any particular species can vary, effective pH of the composition is generally between about less than 1 and 6, and more preferably between about 2 and 5 and most commonly is between about 2.5 and 3.5. It has been found that addition of citric acid is an effective method to regulate the pH of the composition. Citric acid is also inexpensive and readily available.

While the essential components and characteristics of the present composition have been described above, it is contemplated that various other additives can optionally be included, for example, stabilizers, and anti-oxidants, fungicides, nutrients, etc.

One particular additive is a compound to promote the degradation of chlorophyll. Such a compound is advantageous because the true color added to the preserved plant by a dye can only be determined in the absence of chlorophyll. Natural processes will eventually decompose chlorophyll after about thirty days, but for purposes of quality control and rapid production, induced decomposition is preferred.

It has been determined that propylene glycol is an effective additive for the degradation of chlorophyll. Other glycol compounds are also effective for this purpose. When used, this additive comprises approximately five percent to about fifteen percent by volume of the entire composition and more preferably between about seven percent to about ten percent by volume of the composition.

Another optional additive for use when a plant is harvested prior to application of the composition is a sugar, such as dextrose or sucrose. Upon harvesting, a plant goes into shock and shuts down its nutrient transport system. Addition of a sugar to the composition has been found to prolong a plant's ability to aspirate fluids, including the present composition, after being cut down. This effect is beneficial because it increases the likelihood that transport of the preservative will be completed.

It has been determined that a sugar additive is essentially unnecessary when DMSO is used as the facilitator because transport of the composition is so rapid that, even in the absence of a sugar, transport is completed in practically all instances.

Application of a preservative according to the present invention without the use of dyes produces a plant which is life-like in texture and other respects except that eventually the green parts of the plant turn brown as the chlorophyll decomposes. It has been found that many trees will retain their natural colors for about thirty days before turning a brown-rust color. It is contemplated that in the practice of the present invention, a dye can be added to the composition to produce preserved plants in which the leaves or other green parts are colored. The dyes can be green or autumn colors to imitate natural coloring of trees and plants or other colors can be used to produce preserved plants for decorative color accents.

The selection of certain dyes as colorants is critical to effective preservation because many dyes can impede the aspiration of the composition. Therefore, the present invention contemplates the use of dyes which can systemically applied to plants.

It has been found that dyes compatible with the present invention are generally acid dyes. While not intending to be limited hereby, it is believed that basic dyes are unsuitable for systematic application to plants because basic dyes bind with proteins in the plant thereby clogging the systemic transport pathways of a plant.

It has been found that normally for the composition to be effectively transported, it is necessary that dyes be highly pure. It has been found that dyes which are useful in the present invention are generally above about ninety percent absolute purity. As used hereinbelow, purity refers to absolute purity rather than any adjusted standard of purity in the dye industry.

While high purity dyes have generally been found to be effective in the present composition, it has been determined that some extremely pure dyes, approaching ninety percent purity, are ineffective in the present composition. It is not known that impurities or characteristics of even these pure dyes prevent effective aspiration of preservatives. However, the usefulness of a particular dye or combination of dyes for the present invention can be readily determined experimentally by one skilled in the art.

A number of dyes and mixtures thereof have been found to be compatible with systemic application of the present composition. These dyes include the following dyes, produced by Robert Koch Industries, Inc. of Bennett, Colo.: Blue Lace 321, True Blue 659, Sky Blue 388, Bittersweet 205, Brown 400, Burgundy 222, Butterscotch 610, Champagne 602, Gold 514, Chartreuse Green 300, Kelley Green 302, Lime Green 315, Mint Green 312, Turquoise Green 306, Lavender 200, Hot Lavender 201, Lilac 210, Orange 248, Burnt Orange 249, Orchid 225, Peach 500, Pink 214, Hot Pink 1880, Cardinal Red 507, Root Beer 402, Shrimp 240, Sonia 250, Uranine 313, Walnut 999, Wedgewood 350, Yellow 375, Blue #1 Pure, Yellow 17, Carmine 161, Custom Blend Red, Fuchine, Scarlet 4R, Wool Orange, Cardinal Red 507, Burnt Orange 249, and Mint Green 312.

Some of these dyes have been observed to be more readily accepted by plants than others, and therefore, the preservative composition is more rapidly transported. It has been found that Hot Pink 1880 and Sky Blue 388 are the most effective dyes and Orange 248 and Peach 500 are the next most effective dyes. The remaining dyes and mixtures of dyes are similarly effective.

The amount of dye used in a preservative composition can vary according to the intensity of the dye and the desired color. It has been found, however, that approximately one pound of the dyes discussed above per fifty-five gallons of composition produces attractive colors in leaves of trees when preserved in accordance with the present invention.

Application of the present composition can occur either before or after harvesting the plant. The preharvesting method disclosed herein is termed the "Tube Process" and the post-harvesting method is referred to as the "Cutting Process".

The Tube Process is most applicable to larger plants such as trees. In this process, one or more holes are drilled in the trunk of a tree. One end of a piece of tubing is then inserted into the hole or holes and the other end is supported above the hole or holes. The tubing is filled with the composition, and the natural aspiration of the tree systemically transports the composition throughout the tree. The tubes are refilled with composition as it is depleted by the tree. The dye entering the leaves is observed as solution is aspirated. Upon complete penetration of the dye to the outermost leaves, the tubes are removed.

Previously, the Tube Process was dependent on weather conditions because the preservative composition is applied while the tree is still standing and therefore, is still exposed to the elements. Very hot and dry days were required because the trees aspirate liquids more quickly under these conditions.

It has been unexpectedly found that the present composition can be effectively applied by the Tube Process even under rainy overcast conditions without significant changes in success rates because of weather conditions. This surprising result is due to the increased rate of aspiration of the present composition. The preservation of trees can now be achieved without regard to changes in weather conditions.

After complete penetration of the composition by the Tube Process, the tree can be harvested. At this point, the tree dehydrates, during which time, it will take on a permanent position. While not necessary for effective preservation, it is preferred that trees be inverted during dehydration because the trees and branches then attain a more natural looking upright position. Dehydration normally occurs in about five to seven days. However, it should be recognized that this time period can vary with environmental conditions such as humidity, temperature and air circulation.

For preserving by the Cutting Process, a plant is harvested and the exposed cross section is brought into contact with the preservative composition. The composition is aspirated by the plant and complete penetration of the composition can be determined by following the coloration of the dye as it travels throughout the stems and leaves. When the outermost leaves have received the composition, the plant is ready for dehydration.

In the Cutting Process the plant is harvested before application of the composition. After a tree or other plant is cut down, it goes into shock and eventually loses its ability to aspirate liquids. Since the Cutting Process is dependent on the natural aspiration processes of the plant, application of the preservative must be completed before a harvested plant's ability to aspirate the composition is substantially impaired. As used in this context, substantial impairment is defined as being incapable of transport of the preservative.

It has been found that for more effective preservation plants should be harvested and the composition first introduced while the plant is in a non-aspirating stage. For example, plants are preferably harvested in the evening or on overcast days when the rate of aspiration of trees is low. After the plant has initially taken up solution, it can then be exposed to high aspiration conditions for complete transport of the solution throughout the plant, such as higher temperatures and less humidity. It is contemplated that conditions conductive to successful preservation can be artificially created and controlled as an alternative to timing the preservation process with natural cycles and conditions.

While not being limited to the following time sequence, a convenient schedule for preservation of trees by the Cutting Process is to harvest trees in the evening after sunset while the transport system is dormant or nonaspirating. The trees are then placed in composition and the supply is replenished as necessary through the next day. It has been found that solution is aspirated overnight, but that high aspiration rates to carry composition to the outermost parts of the tree occur during warmer daylight hours while the tree is exposed to the sun.

In a preferred embodiment of the Cutting Process for a tree, the sap wood layer is exposed by stripping bark away prior to contact with the composition. The contacting step then comprises contracting the entire exposed surface with composition. Aspiration is thereby enhanced by increasing the surface of the transport system of the plant exposed to the composition.

The following examples are provided by way of illustration and not by way of limitation.

EXAMPLE 1

A solution was prepared by mixing 18 gallons of glycerine, 4 gallons of propylene glycol, ½ gallon of DMSO, and 32 gallons of water. To this mixture was added approximately 1 pound of a desired dye. The pH of the solution was adjusted to 3 by the addition of 1 pound of citric acid. The resulting solution contained ingredients in the following proportions:

| Compound | Percent (by volume) |
| --- | --- |
| Glycerine | 33 |
| Propylene Glycol | 7 |
| DMSO | 1 |
| Water | 59 |

The composition was applied to a number of trees by the Cutting Process. The subject trees werre selected and cut down near the base of the tree. Strips of bark approximately twelve inches long, were removed from the base of the tree trunk down to the sap wood layer. The exposed portions of the trees were placed in a container of the composition and allowed to aspirate the composition until complete penetration of the dye to the outermost leaves was observed. The trees were then inverted and allowed to dehydrate over approximately five to seven days. The results of this process are produced below.

| Species | Number Treated | Number Preserved | Success Ratio (%) |
| --- | --- | --- | --- |
| Narrow Leaf Cottonwoods | 1488 | 1463 | 98 |
| Aspen | 159 | 150 | 94 |
| Sage Brush | 1462 | 1441 | 99 |
| Service Berry | 115 | 106 | 92 |
| Mountain Mahogany | 151 | 143 | 95 |
| Colorado Manzanita | 318 | 300 | 94 |
| Colorado Scrub Oak | 3162 | 3137 | 99 |
| Total | 6285 | 6740 | 98 |

EXAMPLE II

A solution was prepared by mixing 18 gallons of glycerine, ½ gallon of DMSO and 36 gallons of water. To this mixture was added approximately 1 pound of a desired dye. The pH of the solution was adjusted to 3 by addition of approximately 1 pound of citric acid. The resulting solution contained ingredients in the following proportions:

| Compound | Percent (by Volume) |
| --- | --- |
| Glycerine | 33 |
| DMSO | 1 |
| Water | 66 |

The composition was applied to a number of trees by the Cutting Process, as descibed in Example I, and the results are produced below.

| Species | Number Tested | Number Preserved | Success Ratio |
| --- | --- | --- | --- |
| Aspen | 125 | 124 | 99 |
| Oak | 230 | 225 | 98 |
| Total | 355 | 349 | 98 |

EXAMPLE III

As a comparative example of Examples I and II, Aspen and Colorado Scrub Oak were treated with a composition prepared by mixing 14 gallons of glycerine with 41 gallons of water. To this solution approximately 1 pound of dye was added, and the pH was approximately 8. The resulting solution contained ingredients in the following proportions:

| Compound | Percent (By Volume) |
| --- | --- |
| Glycerine | 25 |
| Water | 75 |

The composition was applied to Aspen and Scrub Oak trees by the Cutting Process, as described in Example I, allowing five days for aspiration. The results are produced below.

| Species | Number Treated | Number Preserved | Success Ratio |
| --- | --- | --- | --- |
| Aspen | 25 | 1 | 4 |
| Colorado Scrub Oak | 25 | 1 | 4 |

EXAMPLE IV

As a comparative example to Examples I and II, Narrow Leaf Cottonwood, Sage Brush and Mountain Mahogany trees are treated with a composition prepared by mixing 14 gallons of glycerine with 41 gallons of water. Approximately 1 pound of dye is added, and the pH is adjusted to approximately 3 by the addition of citric acid. The resulting solution contains approximately 25% glycerine by volume and 75% water by volume. The solution is applied to Narrow Leaf Cottonwood, Sage Brush and Mountain Mahogany trees by the Cutting Process, as described in Example I. A preservation success rate of approximately 25% is achieved for each species of tree.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A composition for preserving a plant, comprising:
   (a) a preservative in an amount sufficient to preserve the plant; and
   (b) dimethyl sulfoxide in an amount sufficient to increase the rate of systemic aspiration of said composition into said plant.

2. The composition claimed in claim 1 wherein said preservative is glycerine.

3. A composition for preserving a plant when systemically transported into said plant, said composition comprising:
   (a) a preservative in an amount sufficient to preserve the plant; and
   (b) dimethyl sulfoxide in an amount between about one-half percent and about five percent by volume of said composition.

4. A composition for preserving a plant, comprising:
   (a) a preservative in an amount sufficient to preserve the plant; and
   (b) a facilitator in an amount sufficient to increase the rate of systemic aspiration of said composition into said plant, said facilitator being selected from the group consisting of glyme, dioxane, pyridine, dimethylformamide, diglyme, acetone, tetrahydrofurane, acetonitrile, triglyme, and 1-methyl-2-pyrrolidone.

5. A composition as claimed in claim 4 wherein the pH of said composition is compatible with the natural pH of the plant.

6. A composition as claimed in claim 4 further comprising a dye capable of systemic transport within said plant.

7. A composition as claimed in claim 1, wherein the pH of said composition is compatible with the natural pH of the plant.

8. A composition as claimed in claim 4, wherein said preservative comprises glycerine.

9. A composition as claimed in claim 8 wherein said glycerine comprises about 20 percent by volume to about 50 percent by volume of the composition.

10. A composition as claimed in claim 4 wherein said facilitator comprises less than about 5 percent by volume of the composition.

11. A composition as claimed in claim 4, said composition further comprising a chlorophyll degradant.

12. A composition as claimed in claim 4 wherein said facilitator comprises about one-half to about 3 percent by volume of the composition.

13. A process for preserving a plant comprising introducing to the nutrient transport system of the plant for systemic transport throughout the plant a composition comprising:
   (a) preservative in an amount sufficient to preserve the plant; and
   (b) dimethyl sulfoxide in an amount sufficient to increase the rate of systemic aspiration of said composition into said plant.

14. A process for preserving a plant comprising introducing to the nutrient transport system of the plant for systemic transport throughout the plant a composition comprising:
   (a) a preservative in an amount sufficient to preserve the plant; and
   (b) a facilitator in an amount sufficient to increase the rate of systemic aspiration of said composition into said plant, said facilitator being selected from the group consisting of glyme, dioxane, pyridine, dimethylformamide, diglyme, acetone, tetrahydrofurane, acetonitrile, triglyme, and 1-methyl-2-pyrrolidone.

15. A process as claimed in claim 14 wherein said preservative comprises glycerine.

16. A process as claimed in claim 15 wherein said facilitator comprises less than about 5 percent by volume of the composition and said glycerine comprises about 25 percent by volume to about 40 percent by volume of the composition.

17. A preserved tree produced by the process of claim 15.

18. A process as claimed in claim 13, wherein said preservative comprises glycerine.

19. A composition as claimed in claim 1, further comprising a dye capable of systemic transport within said plant.

20. A composition as claimed in claim 2, wherein said glycerine comprises about twenty percent by volume to about fifty percent by volume of the composition.

21. A composition as claimed in claim 1, wherein said dimethyl sulfoxide comprises less than about five percent by volume of the composition.

22. A composition as claimed in claim 21, said composition further comprising a chlorophyll degradant.

23. A composition as claimed in claim 22, wherein said chlorophyll degradant is a glycol.

24. A composition as claimed in claim 22, wherein said chlorophyll degradant is propylene glycol.

25. A composition as claimed in claim 24, wherein said propylene glycol comprises between about five to about fifteen percent by volume of the composition.

26. A composition as claimed in claim 1, wherein said dimethyl sulfoxide comprises about one-half to about three percent by volume of the composition.

27. A composition as claimed in claim 4, wherein said facilitator comprises about one-half percent by volume to about one and one-half percent by volume of the composition.

28. A composition as claimed in claim 2, wherein said glycerine comprises about thirty to about thirty-five percent by volume of the composition, said dimethyl sulfoxide comprises about one-half to about one and one-half percent by volume of the composition, said composition further comprising a dye capable of systemic transport within the plant.

29. Composition as claimed in claim 28, further comprising propylene glycol between about seven to about ten percent by volume of the composition.

30. A process as claimed in claim 18, wherein said dimethyl sulfoxide comprises less than about five percent by volume of the composition and said glycerine comprises about twenty-five percent by volume to about forty percent by volume of the composition.

31. A process as claimed in claim 30, wherein said composition further comprises propylene glycol between about seven to about ten percent by volume.

32. A process as claimed in claim 18, wherein the step of introducing comprises:
   (a) drilling a hole in the base of a tree;
   (b) inserting a means for supplying said composition into said hole; and
   (c) introducing said composition into said tree through said means.

33. A process as claimed in claim 32, further comprising the steps of:
   (a) cutting the tree near the base of the tree after completion of the systemic transport of said completion; and
   (b) inverting the tree during dehydration whereby the limbs of the tree take on a natural position.

34. A process as claimed in claim 18, wherein the step of introducing comprises:
   (a) cutting a tree near the base of the tree;
   (b) exposing a portion of the sap wood layer of the tree along the trunk of the tree; and
   (c) contacting said composition to said sap wood layer.

35. A process as claimed in claim 34, wherein said contacting step occurs before the ability of the tree to aspirate said composition through said sap wood layer is substantially impaired.

36. A preserved tree produced by the process of claim 18.

37. A preserved tree produced by the process of claim 31.

* * * * *